United States Patent
Kim et al.

(10) Patent No.: US 9,479,305 B2
(45) Date of Patent: Oct. 25, 2016

(54) METHOD AND APPARATUS FOR TRANSMITTING SOUNDING REFERENCE SIGNAL

(71) Applicant: LG ELECTRONICS INC., Seoul (KR)

(72) Inventors: Hak Seong Kim, Anyang-si (KR); Ki Jun Kim, Anyang-si (KR); Byoung Hoon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 111 days.

(21) Appl. No.: 14/369,605

(22) PCT Filed: Dec. 28, 2012

(86) PCT No.: PCT/KR2012/011670
§ 371 (c)(1),
(2) Date: Jun. 27, 2014

(87) PCT Pub. No.: WO2013/100680
PCT Pub. Date: Jul. 4, 2013

(65) Prior Publication Data
US 2014/0362799 A1    Dec. 11, 2014

Related U.S. Application Data

(60) Provisional application No. 61/581,069, filed on Dec. 28, 2011.

(51) Int. Cl.
*H04W 4/00* (2009.01)
*H04L 5/00* (2006.01)
(Continued)

(52) U.S. Cl.
CPC .......... *H04L 5/0048* (2013.01); *H04L 5/0007* (2013.01); *H04L 1/0026* (2013.01); *H04W 74/006* (2013.01)

(58) Field of Classification Search
CPC . H04L 5/0048; H04L 5/0007; H04L 5/0035; H04L 5/0058; H04L 5/0078; H04L 27/261; H04L 1/0026; H04L 27/2613; H04W 24/10
See application file for complete search history.

(56) References Cited

U.S. PATENT DOCUMENTS 7,643,832 B2 * 1/2010 Cudak ............... H04L 5/005
455/436
8,780,878 B2 * 7/2014 Lin ................. H04L 5/0051
370/329
(Continued)

FOREIGN PATENT DOCUMENTS

KR    10-2010-0107376 A    10/2010
KR    10-2011-0008303 A    1/2011
(Continued)

OTHER PUBLICATIONS

Panasonic, "Clarification of One Shot SRS," 3GPP TSG RAN WG1 Meeting #66, R1-112354, Athens, Greece, Aug. 22-26, 2011, pp. 1-6.
(Continued)

*Primary Examiner* — Brian O'Connor
(74) *Attorney, Agent, or Firm* — Birch, Stewart, Kolasch & Birch, LLP

(57) ABSTRACT

Provided are a method and a wireless device for transmitting a sounding reference signal in a wireless communication system. The wireless device receives an SRS (sounding reference signal) configuration for a periodic transmission, and transmits the SRS in a randomly determined subframe from among a plurality of SRS subframes determined on the basis of the SRS configuration.

5 Claims, 6 Drawing Sheets

(51) Int. Cl.
*H04L 1/00* (2006.01)
*H04W 74/00* (2009.01)

(56) References Cited

U.S. PATENT DOCUMENTS

| | | | | |
|---|---|---|---|---|
| 8,797,966 B2* | 8/2014 | Dinan | .................. | H04L 5/0057 370/252 |
| 8,811,305 B2* | 8/2014 | Li | ...................... | H04W 74/006 370/329 |
| 8,971,381 B2* | 3/2015 | Seo | ........................ | H04J 13/18 370/328 |
| 8,982,851 B2* | 3/2015 | Agrawal | ............... | H04L 5/0048 370/208 |
| 8,989,130 B2* | 3/2015 | Dinan | ............... | H04W 72/0406 370/208 |
| 9,247,564 B2* | 1/2016 | Kang | .................. | H04L 1/0026 |
| 2010/0195481 A1* | 8/2010 | Lee | ...................... | H04L 27/262 370/203 |
| 2011/0058505 A1 | 3/2011 | Pan et al. | | |
| 2011/0268087 A1 | 11/2011 | Kwon et al. | | |
| 2011/0306335 A1 | 12/2011 | Yang et al. | | |
| 2012/0008711 A1* | 1/2012 | Lee | .................... | H04L 27/2613 375/295 |
| 2012/0243505 A1* | 9/2012 | Lin | ...................... | H04L 5/0051 370/331 |
| 2012/0252474 A1* | 10/2012 | Tiirola | ................. | H04L 5/0048 455/450 |
| 2012/0287900 A1 | 11/2012 | Seo et al. | | |
| 2012/0300715 A1* | 11/2012 | Pelletier | ............ | H04W 56/0005 370/329 |
| 2013/0077514 A1* | 3/2013 | Dinan | .................. | H04L 5/0057 370/252 |

FOREIGN PATENT DOCUMENTS

KR  10-2011-0090805 A  8/2011
KR  10-2011-0122047 A  11/2011

OTHER PUBLICATIONS

Samsung, "Summary of Reflector Discussions on EUTRA UL RS," 3GPP TSG RAN WG1 Meeting #49bis, Orlando, USA, R1-073091, Jun. 25-29, 2007, pp. 1-3.
3GPP TS 36.211 V10.4.0, "3rd Generation Partnership Project; Technical Specification Group Radio Access Network; Evolved Universal Terrestrial Radio Access (E-UTRA); Physical Channels and Modulation (Release 10)", Dec. 2011, pp. 1-101.

* cited by examiner

FIG. 2

Cell specific SRS subframe (period T=2)

| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |

UE specific SRS subframe (period T=10)

| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |

METHOD AND APPARATUS FOR TRANSMITTING SOUNDING REFERENCE SIGNAL

CROSS REFERENCE TO RELATED APPLICATIONS

This application is the National Phase of PCT International Application No. PCT/KR2012/011670, filed on Dec. 28, 2012, which claims priority under 35 U.S.C. 119(e) to U.S. Provisional Application No. 61/581,069, filed on Dec. 28, 2011, all of which are hereby expressly incorporated by reference into the present application.

BACKGROUND OF THE INVENTION

1. Field of the Invention

The present invention relates to wireless communications, and more particularly, to a method and apparatus for transmitting a sounding reference signal in a wireless communication system.

2. Related Art $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

An uplink reference signal may be classified into a demodulation reference signal (DMRS) and a sounding reference signal (SRS). The DMRS is a reference signal used in channel estimation for demodulation of a received signal. The SRS is a reference signal transmitted for uplink scheduling by a user equipment to a base station. The base station estimates an uplink channel by using the received SRS, and the estimated uplink channel is used in uplink scheduling.

Various uplink signals such as an uplink reference signal may be transmitted periodically. However, a periodic transmission of the uplink signal may cause a significant interference in a specific frequency region by forming a specific tone. In addition, a plurality of periodic signals may cause a narrowband interference formed with a plurality of tones.

It is necessary to mitigate an interference caused by a periodic uplink transmission.

SUMMARY OF THE INVENTION

The present invention provides a method of transmitting a sounding reference signal to avoid a periodic transmission of the sounding reference signal, and a wireless device using the method.

In an aspect, a method for transmitting a sounding reference signal (SRS) in a wireless communication system is provided. The method includes receiving by a wireless device, an SRS configuration for a periodic transmission, and transmitting by the wireless device, the SRS in a randomly selected subframe among a plurality of SRS subframes determined based on the SRS configuration.

The SRS configuration may be a cell-specific SRS configuration.

The wireless device may select the subframe according to a random interval determined based on a random sequence generator.

The random sequence generator may be initialized based on an identifier of the wireless device.

In another aspect, a wireless device for transmitting a sounding reference signal (SRS) in a wireless communication system is provided. The wireless device includes a radio frequency (RF) unit configured to transmit and receive a radio signal, and a processor operatively coupled to the RF unit and configured to receive an SRS configuration for a periodic transmission and transmit the SRS in a randomly selected subframe among a plurality of SRS subframes determined based on the SRS configuration.

An interference caused by a periodic transmission of an uplink signal can be avoided.

BRIEF DESCRIPTION OF THE DRAWINGS

FIG. 2 shows an example of a periodic sounding reference signal (SRS) transmission.

DESCRIPTION OF EXEMPLARY EMBODIMENTS

A wireless device may be fixed or mobile, and may be referred to as another terminology, such as a user equipment (UE), a mobile station (MS), a user terminal (UT), a subscriber station (SS), a mobile terminal (MT), etc. A base station (BS) is generally a fixed station that communicates with the wireless device and may be referred to as another terminology, such as an evolved node-B (eNB), a base transceiver system (BTS), an access point, etc.

Hereinafter, the present invention is applied based on a $3^{rd}$ generation partnership project (3GPP) long term evolution (LTE) or a 3GPP LTE-Advanced (LTE-A). This is for exemplary purposes only, and thus the present invention is applicable to various communication systems. In the following description, LTE and/or LTE-A are collectively referred to as LTE.

The wireless device may be served by a plurality of serving cells. Each serving cell may be defined with a downlink (DL) component carrier (CC) or a pair of a DL CC and an uplink (UL) CC.

The serving cell can be classified into a primary cell and a secondary cell. The primary cell operates at a primary frequency, and is a cell designated as the primary cell when the UE performs an initial network entry process or starts a network re-entry process or performs a handover process. The primary cell is also called a reference cell. The secondary cell operates at a secondary frequency. The secondary cell can be configured after an RRC connection is established, and can be used to provide an additional radio resource. At least one primary cell is configured always. The secondary cell can be added/modified/released by using higher-layer signaling (e.g., RRC messages).

The CI of the primary cell may be fixed. For example, a lowest CI can be designated as a CI of the primary cell. It is assumed hereinafter that the CI of the primary cell is 0 and a CI of the secondary cell is allocated sequentially starting from 1.

Figure 1:
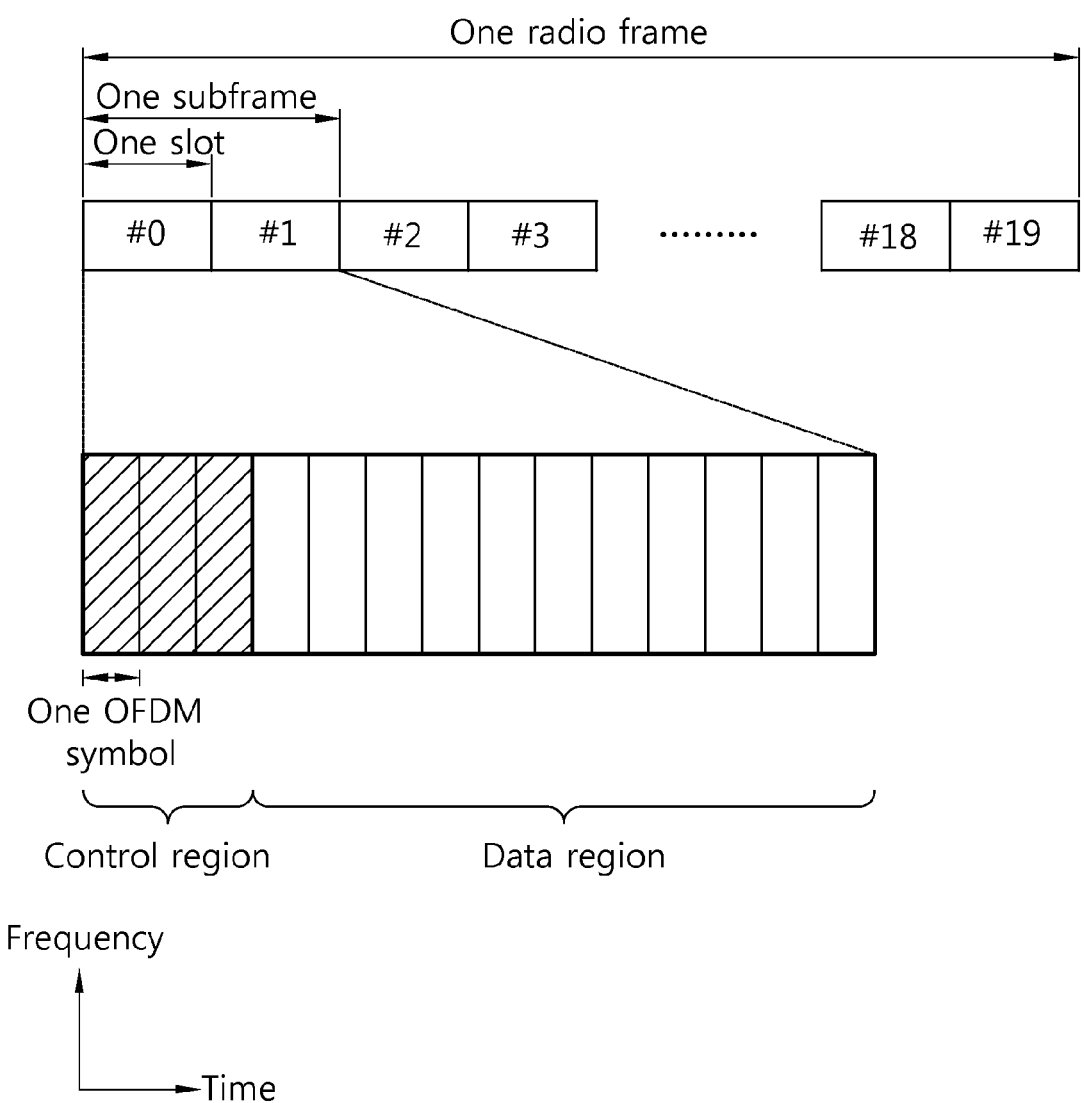
FIG. 1 shows a downlink radio frame structure in $3^{rd}$ generation partnership project (3GPP) long term evolution (LTE).

FIG. 1 shows a structure of a downlink radio frame in 3GPP LTE-A. The section 4 of 3GPP TS 36.211 V8.7.0 (2009-05) "Evolved Universal Terrestrial Radio Access (E-UTRA); Physical Channels and Modulation (Release 8)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB may include 7×12 resource elements (REs).

A DL subframe is divided into a control region and a data region in the time domain. The control region includes up to $1^{st}$ four OFDM symbols of a $1^{st}$ slot in the subframe. However, the number of OFDM symbols included in the control region may vary. A physical downlink control channel (PDCCH) and other control channels are allocated to the control region, and a physical downlink shared channel (PDSCH) is allocated to the data region.

As disclosed in 3GPP TS 36.211 V8.7.0, in 3GPP LTE, a physical channel may be classified into a data channel, i.e., a physical downlink shared channel (PDSCH) and a physical uplink shared channel (PUSCH), and a control channel, i.e., a physical downlink control channel (PDCCH), a physical control format indicator channel (PCFICH), a physical hybrid-ARQ indicator channel (PHICH), and a physical uplink control channel (PUCCH).

The PCFICH transmitted in a $1^{st}$ OFDM symbol of the subframe carries a control format indicator (CFI) regarding the number of OFDM symbols (i.e., a size of the control region) used for transmission of control channels in the subframe. A wireless device first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the wireless device is transmitted on the PHICH.

A physical broadcast channel (PBCH) is transmitted in $1^{st}$ four OFDM symbols in a $2^{nd}$ slot of a $1^{st}$ subframe of a radio frame. The PBCH carries system information necessary for communication between the wireless device and a BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

In 3GPP LTE, blind decoding is used to detect a PDCCH. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

A BS determines a PDCCH format according to DCI to be transmitted to a wireless device, attaches a cyclic redundancy check (CRC) to control information, and masks a unique identifier (referred to as a radio network temporary identifier (RNTI)) to the CRC according to an owner or usage of the PDCCH.

According to 3GPP TS 36.211 V8.7.0, an uplink channel includes a PUSCH, a PUCCH, a sounding reference signal (SRS), and a physical random access channel (PRACH).

The PUCCH supports multiple formats. A PUCCH having a different number of bits per subframe can be used according to a modulation scheme which is dependent on the PUCCH format. The PUCCH format 1 is used for transmission of a scheduling request (SR). The PUCCH formats 1a/1b are used for transmission of an ACK/NACK signal. The PUCCH format 2 is used for transmission of a channel quality indicator (CQI). The PUCCH formats 2a/2b are used for simultaneous transmission of the CQI and the ACK/NACK signal. When only the ACK/NACK signal is transmitted in a subframe, the PUCCH formats 1a/1b are used. When the SR is transmitted alone, the PUCCH format 1 is used. When the SR and the ACK/NACK are simultaneously transmitted, the PUCCH format 1 is used, and in this transmission, the ACK/NACK signal is modulated by using a resource allocated to the SR.

Now, a sounding reference signal (SRS) transmission will be described.

The SRS transmission can be classified into a periodic SRS transmission and an aperiodic SRS transmission. The periodic SRS transmission is when transmission is performed in a subframe triggered by a periodic SRS configuration. The periodic SRS configuration includes an SRS periodicity and an SRS subframe offset. If the periodic SRS configuration is given, a UE can periodically transmit an SRS in a subframe satisfying the periodic SRS configuration.

Hereinafter, a subframe in which the SRS can be transmitted is called an SRS subframe. In the periodic SRS transmission and the aperiodic SRS transmission, the SRS can be determined in an SRS subframe determined UE-specifically.

An OFDM symbol in which the SRS is transmitted may have a fixed position in the SRS subframe. For example, the SRS may be transmitted in a last OFDM symbol of the SRS subframe. The OFDM symbol in which the SRS is transmitted is called a sounding reference symbol.

In 3GPP LTE, for a periodic SRS transmission, a cell-specific SRS subframe and a UE-specific SRS subframe are defined.

The cell-specific SRS subframe is configured commonly to wireless devices in a cell. As disclosed in the section 5.5.3 of 3GPP TS 36.211 V8.7.0, the cell-specific SRS subframe is configured by a variable of srs-SubframeConfig and by a configuration period $T_{SFC}$ and a transmission offset $T_{SFC}$. The cell-specific SRS subframe is a subframe which satisfies floor($n_s$/2) mod $T_{SFC} \in T_{SFC}$ (where $n_s$ is a slot number in a radio frame).

The following table is an exemplary configuration for the cell-specific SRS subframe.

TABLE 1

| srs-SubframeConfig | Configuration period $T_{SFC}$ | Transmission offset $F_{SFC}$ |
|---|---|---|
| 0 | 1 | {0} |
| 1 | 2 | {0} |
| 2 | 2 | {1} |
| 3 | 5 | {0} |
| 4 | 5 | {1} |
| 5 | 5 | {2} |
| 6 | 5 | {3} |
| 7 | 5 | {0, 1} |
| 8 | 5 | {2, 3} |
| 9 | 10 | {0} |
| 10 | 10 | {1} |
| 11 | 10 | {2} |
| 12 | 10 | {3} |
| 13 | 10 | {0, 1, 2, 3, 4, 6, 8} |
| 14 | 10 | {0, 1, 2, 3, 4, 5, 6, 8} |
| 15 | reserved | reserved |

The UE-specific SRS subframe is configured by using signaling specific to the wireless device. As disclosed in the section 8.2 of 3GPP TS 36.213 V8.7.0, the UE-specific SRS subframe is configured by a variable of an SRS configuration index and by an SRS periodicity $T_{SRS}$ and an SRS subframe offset $T_{offset}$. In FDD, the UE-specific SRS subframe is a subframe which satisfies $(10n_f+k_{SRS}-T_{offset})$ mod $T_{SRS}=0$ (where $n_f$ is a system frame number, and $k_{SRS}= \{0, 1, \ldots, 9\}$ is a subframe number in a radio frame).

The following table is an exemplary configuration of the UE-specific SRS subframe.

TABLE 2

| SRS configuration index $I_{SRS}$ | SRS periodicity $T_{SRS}$ (ms) | SRS subframe offset $T_{offset}$ |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

FIG. 2 shows an example of a periodic SRS transmission.

When a configuration period of a cell-specific SRS subframe is set to $T_{SFC}=2$ and an SRS period of the cell-specific SRS subframe is set to $T_{SRS}=10$, a UE-specific SRS subframe belongs to the cell-specific SRS subframe, and a wireless device may transmit an SRS in the cell-specific SRS subframe.

In the aperiodic SRS transmission, the SRS is transmitted upon detection of an SRS request of a BS. For the aperiodic SRS transmission, the SRS configuration is given in advance. The SRS configuration also includes an SRS periodicity $T_{SRS}$ and an SRS subframe offset $T_{offset}$.

The SRS request for triggering the aperiodic SRS transmission may be included in a DL grant or a UL grant on a PDCCH. For example, if the SRS request is 1 bit, '0' may indicate a negative SRS request, and '1' may indicate a positive SRS request. If the SRS request is 2 bits, '00' may indicate a negative SRS request, and the others may indicate a positive SRS request. In this case, one of a plurality of SRS configurations for SRS transmission can be selected.

If the DL grant or the UL grant does not include a CI, an SRS can be transmitted in a serving cell of a PDCCH in which an SRS request is detected. If the DL grant or the UL grant includes the CI, the SRS can be transmitted in a serving cell indicated by the CI.

Assume that the positive SRS request is detected in a subframe n of a serving cell c. Upon detection of the positive SRS request, an SRS is transmitted in a $1^{st}$ subframe satisfying a condition of n+k where k≥4 as well as $T_{SRS}>2$ in time division duplex (TDD) and $(10*n_f+k_{SRS}-T_{offset})$ mod $T_{SRS}=0$ in frequency division duplex (FDD). In FDD, a subframe index $k_{SRS}$ is $\{0, 1, \ldots, 9\}$ in a frame $n_f$. In TDD, $k_{SRS}$ is defined by a predetermined table. In TDD of $T_{SRS}=2$, the SRS is transmitted in a $1^{st}$ subframe satisfying a condition of $(k_{SRS}-T_{offset})$ mod 5=0.

Figure 3:
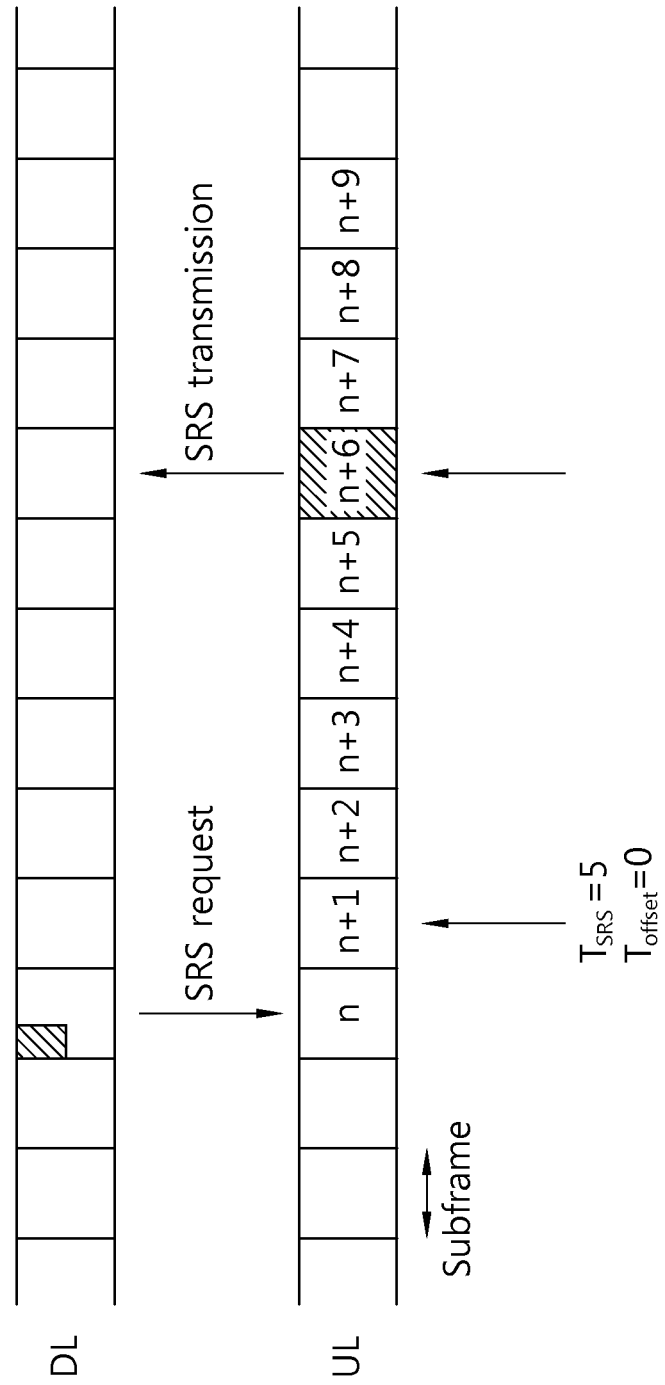
FIG. 3 shows an example of an aperiodic SRS transmission.

FIG. 3 shows an example of an aperiodic SRS transmission. It is assumed that an SRS configuration includes an SRS periodicity $T_{SRS}=5$ and an SRS subframe offset $T_{offset}=0$.

It is assumed that a subframe n+1 and a subframe n+6 are subframes in which SRS transmission is possible, according to the SRS configuration.

If an SRS request is detected on a PDCCH of a subframe n, the SRS is transmitted in the subframe n+6 which is a $1^{st}$ subframe satisfying the SRS configuration after a subframe n+4.

A transmit power $P_{SRS,c}(i)$ of an SRS is defined as follows in a subframe i of a serving cell c.

$$P_{SRS,c}(i) = \min\{P_{CMAX,c}(i), P_{SRS\_OFFSET,c}(m) + 10 \log_{10}(M_{SRS,c}) + P_{O\_PUSCH,c}(j) + \alpha_c(j)PL_c + f_c(i)\} \quad \text{[Equation 1]}$$

Herein, $P_{CMAX,c}(i)$ is a maximum transmit power determined in the subframe i of the serving cell c.

$P_{SRS\_OFFSET,c}(m)$ is a 4-bit UE specific parameter semi-statically determined by a higher layer with respect to m=0 and m=1 of the serving cell c. Herein, m=0 in case of a periodic SRS, and m=1 in case of an aperiodic SRS.

$M_{SRS,c}$ is a bandwidth of SRS transmission in the subframe i of the serving cell c.

$P_{O\_PUSCH,c}(j)$ is a parameter configured by a sum of $P_{O\_NOMINAL\_PUSCH,c}(j)$ which is a cell-specific nominal component given by the higher layer in the subframe i of the serving cell c and $P_{O\_UE\_PUSCH,c}(j)$ which is a UE-specific component, where j=1.

$\alpha_c(j)$ is a 3-bit parameter given by the higher layer with respect to the serving cell c, where j=1.

$PL_c$ is a downlink pathloss estimation value calculated by the UE with respect to the serving cell c.

$f_c(i)$ is a current PUSCH power control adjustment state with respect to the serving cell c.

Now, a problem caused by an SRS transmission and a proposed solution thereof will be described.

In 3GPP LTE, a DL channel and a UL channel are transmitted on a subframe basis. In addition, a UL signal such as an SRS may be configured to be transmitted periodically, as described above.

However, a periodic transmission of the UL signal may cause a significant interference in a specific frequency region by forming a specific tone. In addition, a plurality of periodic signals may cause a narrowband interference formed with a plurality of tones.

To solve an interference problem caused by the periodic transmission, it is proposed to convert a periodic signal into an aperiodic signal. It is necessary to allow not to have a periodicity while maintaining a channel structure of the legacy system such as 3GPP LTE.

For example, a period, a transmission band, an offset, a hopping band, etc., are configured for the periodic SRS transmission. A cell-specific SRS subframe is first configured, and then a UE-specific SRS subframe is configured among the cell-specific SRS subframes, thereby performing the periodic SRS transmission. According to the proposed method, a UE-specific SRS configuration is modified to remove a periodic feature by transmitting an SRS according to a random interval.

Figure 4:
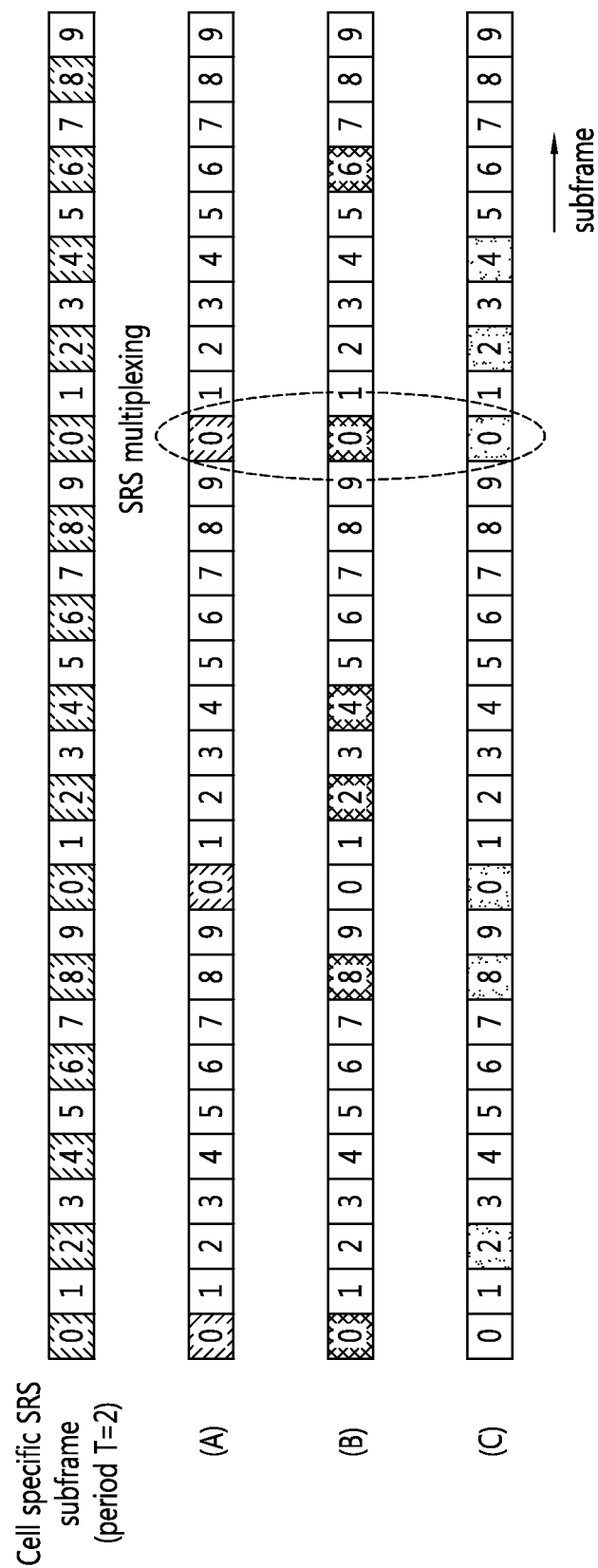
FIG. 4 shows an example of an SRS transmission according to an embodiment of the present invention.

FIG. 4 shows an example of an SRS transmission according to an embodiment of the present invention.

It is assumed that a configuration period of a cell-specific SRS subframe is set to $T_{SFC}=2$.

FIG. 4(A) shows that an SRS period of a cell-specific SRS subframe is set to $T_{SRS}=10$. A wireless device supporting the legacy 3GPP LTE may periodically transmit an SRS in a cell-specific SRS subframe.

FIGS. 4(B) and (C) show an SRS transmission having a random interval. A wireless device may transmit an SRS by using a randomly determined subframe among cell-specific SRS subframes.

The wireless device may determine a UE-specific SRS subframe according to the random interval, instead of determining the UE-specific SRS subframe according to the conventional UE-specific SRS configuration.

Various random number generators may be used to determine the random interval. For example, a pseudo-random sequence having a length of 31 may be defined as follows. In a sequence $c(n)$, $n=0, 1, \ldots, M-1$, where M is a length of $c(n)$.

$$c(n)=(x1(n+Nc)+x2(n+Nc)) \bmod 2$$

$$x1(n+31)=(x1(n+3)+x1(n)) \bmod 2$$

$$x2(n+31)=(x2(n+2)+x2(n+1)+x2(n)) \bmod 2 \quad \text{[Equation 2]}$$

Nc is a specific value, and for example, may be 1600. A pseudo-random sequence generator may be initialized based on a wireless device's identifier (or a value related thereto). The wireless device's identifier may include a cell-radio network temporary identifier (C-RNTI).

In addition to the aforementioned random sequence, various methods may be applied to avoid the periodic SRS transmission. The periodic transmission may be avoided when the wireless device discards an SRS transmission randomly or arbitrarily in a UE-specific SRS subframe periodically configured. Alternatively, the periodic transmission may be avoided when the wireless device additionally transmits an SRS randomly or arbitrarily in another subframe other than the UE-specific SRS subframe periodically configured.

SRS multiplexing in a specific subframe is one of aspects to be considered to apply the proposed method. In case of a periodic SRS transmission, a BS determines how an SRS of a specific wireless device will be multiplexed in a specific transmission band in a specific subframe, and a periodic SRS configuration is determined on the basis thereof. It is also necessary to multiplex the SRS even in a case where an SRS transmission subframe is determined on the basis of a random sequence. For this, information on a random sequence generator may be reported to each wireless device, and an SRS configuration may be determined such that multiplexing is possible among these wireless devices.

There is a need for a method for avoiding an SRS collision between a $1^{st}$ wireless device supporting only a periodic SRS and a $2^{nd}$ wireless device supporting a random transmission SRS. A $1^{st}$ subframe set for transmitting an SRS by the $1^{st}$ wireless device and a $2^{nd}$ subframe set for transmitting an SRS by the $2^{nd}$ wireless device may be specified separately when managed. A sum of the $1^{st}$ and $2^{nd}$ subframe sets may be a set of cell-specific subframes. Information for configuring the $1^{st}$ and $2^{nd}$ subframe sets may be transmitted from the BS to the wireless device.

When a plurality of wireless devices transmit a plurality of SRSs in the same subframe for SRS multiplexing, it may be configured such that the plurality of SRSs are transmitted in different frequency bands.

Figure 5:
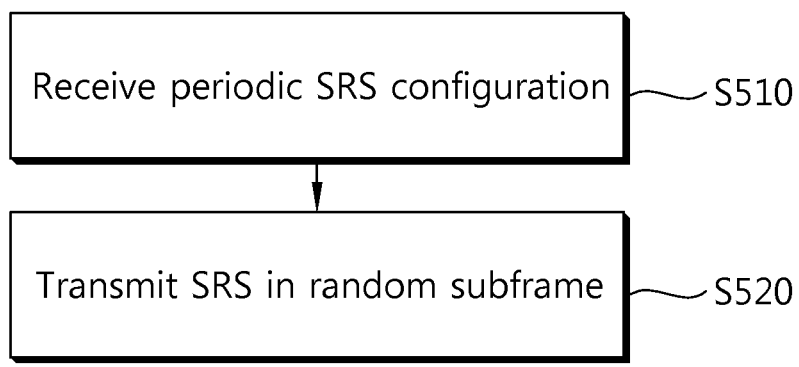
FIG. 5 is a flowchart showing an SRS transmission method according to an embodiment of the present invention.

FIG. 5 is a flowchart showing an SRS transmission method according to an embodiment of the present invention.

In step S510, a wireless device receives an SRS configuration for a periodic transmission. The SRS configuration may be a cell-specific SRS configuration.

In step S520, the wireless device transmits an SRS in a subframe determined randomly among a plurality of SRS subframes determined according to the SRS configuration. A random interval may be determined on the basis of a random sequence generator. Alternatively, a periodic SRS transmission may be avoided by adding or excluding a UE-specific SRS subframe in the UE-specific SRS configuration.

In the aforementioned embodiment, an SRS is taken as an example of a periodic UL signal. In addition to the periodic SRS transmission, the present invention may also apply to periodic channel state information (CSI) reporting on a PUCCH. For the periodic CSI reporting, a periodic CSI configuration is received by a wireless device from a BS. A subframe in which periodic CSI is triggered may be determined on the basis of a random interval.

Figure 6:
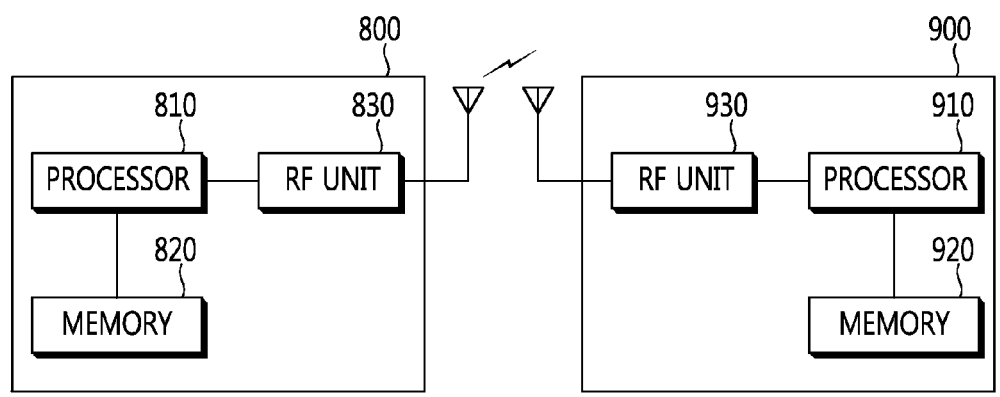
FIG. 6 is a block diagram of a wireless communication system according to an embodiment of the present invention.

FIG. 6 is a block diagram of a wireless communication system according to an embodiment of the present invention.

A BS 800 includes a processor 810, a memory 820, and a radio frequency (RF) unit 830. The memory 820 operatively coupled to the processor 810 stores a variety of information for driving the processor 810. The RF unit 830 operatively coupled to the processor 810 transmits and/or receives a radio signal. The processor 810 implements the proposed functions, procedure, and/or methods. In the aforementioned embodiment, an operation of one or more cells may be implemented by the processor 810.

A wireless device 900 includes a processor 910, a memory 920, and an RF unit 930. The memory 920 operatively coupled to the processor 910 stores a variety of information for driving the processor 910. The RF unit 930 operatively coupled to the processor 910 transmits and/or receives a radio signal. The processor 910 implements the proposed functions, procedure, and/or methods. In the aforementioned embodiment, an operation of the wireless device may be implemented by the processor 910.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting a sounding reference signal (SRS) in a wireless communication system, the method comprising:
   receiving, by a wireless device, an SRS configuration for a periodic transmission; and
   transmitting, by the wireless device, the SRS based on the SRS configuration,
   wherein the received SRS configuration includes a cell specific SRS configuration,
   wherein a cell specific SRS transmission subframe is configured by using the cell specific SRS configuration,
   wherein a user equipment (UE) specific SRS transmission subframe is configured by using a UE specific parameter from the configured cell specific SRS transmission subframe, and
   wherein the SRS is transmitted through the configured UE specific SRS transmission subframe according to a random interval determined based on a random sequence generator.

2. The method of claim 1, wherein the random sequence generator is initialized based on an identifier of the wireless device.

3. The method of claim 1, wherein the SRS is transmitted in a last orthogonal frequency division multiplexing (OFDM) symbol of the UE specific SRS transmission subframe.

4. A wireless device for transmitting a sounding reference signal (SRS) in a wireless communication system, the wireless device comprising:
   a radio frequency (RF) unit configured to transmit and receive a radio signal; and
   a processor operatively coupled to the RF unit and configured to:
      receive an SRS configuration for a periodic transmission; and
      transmit the SRS based on the SRS configuration,
   wherein the received SRS configuration includes a cell specific SRS configuration,
   wherein a cell specific SRS transmission subframe is configured by using the cell specific SRS configuration,
   wherein a user equipment (UE) specific SRS transmission subframe is configured by using a UE specific parameter from the configured cell specific SRS transmission subframe, and
   wherein the SRS is transmitted through the configured UE specific SRS transmission subframe according to a random interval determined based on a random sequence generator.

5. The wireless device of claim 4, wherein the random sequence generator is initialized based on an identifier of the wireless device.

* * * * *